Dec. 2, 1958 S. G. H. EKETORP ET AL 2,862,811
CONTINUOUS IRON AND STEEL MAKING IN A ROTARY VESSEL
Filed Sept. 12, 1955
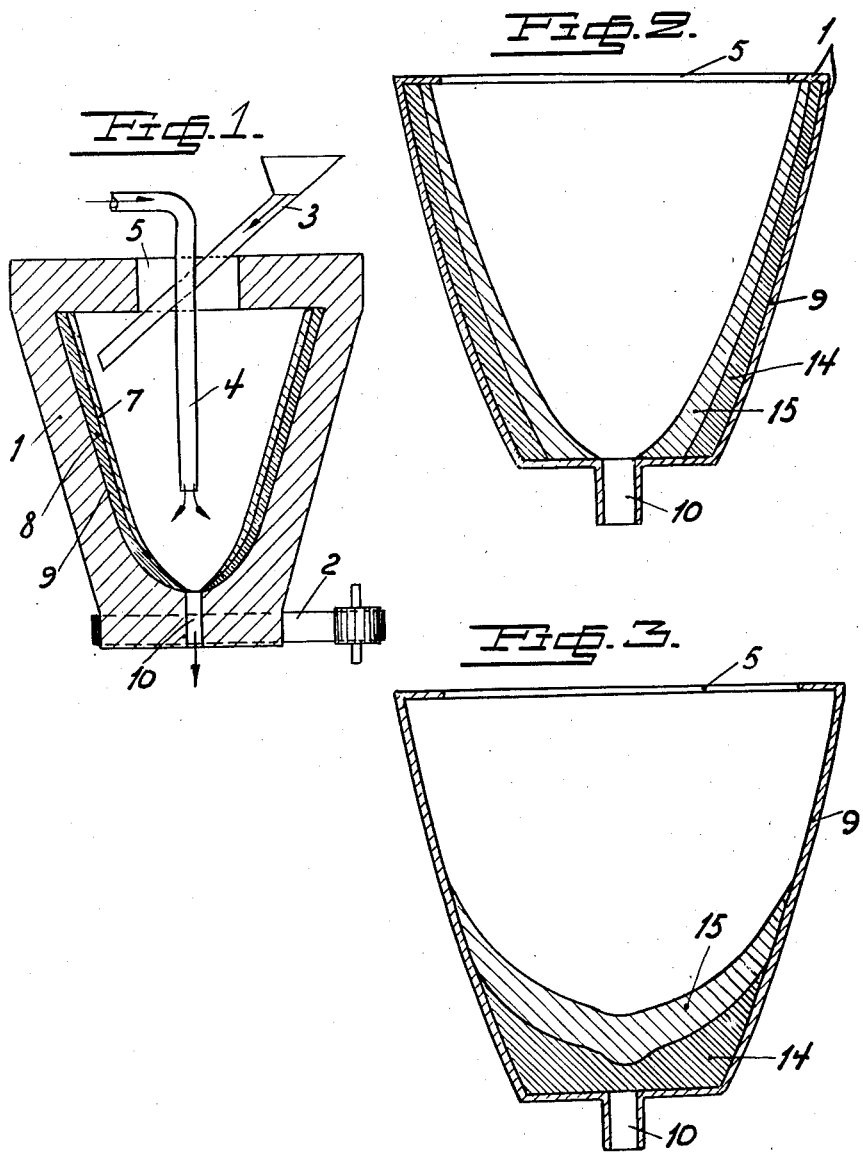

United States Patent Office 2,862,811
Patented Dec. 2, 1958

2,862,811

CONTINUOUS IRON AND STEEL MAKING IN A ROTARY VESSEL

Sven Gustav Harald Eketorp and Sven Hjalmar Backström, Borlänge, Sweden, assignors to Stora Kopparbergs Bergslags Aktiebolaget, Domnarvet, Sweden Application September 12, 1955, Serial No. 533,663

Claims priority, application Sweden September 14, 1954

5 Claims. (Cl. 75—60)

The object of this invention is to make possible rapid and continuous metallurgical reactions in fluid phase or between fluid phases or between a fluid phase and a gas. Fluid phase is meant to include, besides liquids, fine-grained material with free-running properties. A purpose of the invention is to enable the reactions to take place with the fluid phase extended over a large surface compared to its volume and under highly uniform conditions, making possible a continuous performance of the process. This invention also offers great possibilities of working with fluid, aggressive materials, as certain metallurgical slags, without any risk of attack on the furnace wall or other types of walls.

According to this invention, the reaction is performed in a rotating vessel of a shape mainly known previously and working in a way already described, for instance in German Patent No. 628,210. The vessel can consist of a crucible or a kiln or other container, having a central tapping hole in the bottom and being made to rotate at a high speed around a vertical axis passing through the tapping hole. If the vessel is filled to a certain volume with a fluid material, as one or several liquids and/or one or several free-running powders, the interior surface of the liquid or the powder will take a parabolic form during the rotation. The shape of this interior surface is determined by the speed of rotation in such a way that the parabola becomes more longish at a higher and more flat at a lower speed. In the following, when nothing else is understood from the text, the term "liquid" is meant to include all materials capable of taking liquid form, also powders. When the vessel contains a certain amount of liquid and the speed of rotation has a value corresponding to this amount, the fluid material will reach the periphery of the central tapping hole. When the quantity of liquid is increased or the speed of rotation is diminished, the liquid starts running out through the central bottom hole.

Such a vessel is particularly adapted for various chemical and metallurgical operations, especially when performing reactions with or without simultaneous heating by means of hot or burning gases, but even when only heating a material by such gases. The liquid surface exposed to the treatment is considerably larger in a rotating vessel than in a stationary vessel with a horizontal bath, and this larger surface is attained without the surface of the liquid being exposed to an uneven movement, as it is centrifuged towards the vessel wall.

The invention is described below with reference to the attached drawing.

Fig. 1 of the drawing shows in vertical cross section a rotary kiln suitable for instance for refining iron, and Figs. 2 and 3 illustrate schematically a rotary vessel charged with two phases of liquids, Fig. 2 at a higher and Fig. 3 at a lower speed of rotation.

In steelmaking, pure oxygen has lately been introduced as refining agent for pig iron. When performing the method according to the invention in the apparatus shown in Fig. 1, where the container 1 is brought to rotation by means of for instance a driving-belt 2, the pig iron is charged, if desired, together with a slag former and a cooling material, such as scrap iron or fine-grained ore, at the top of the container or kiln 1 through a pipe 3, and oxygen is introduced through a pipe 4 in the center of the container. The combustion gases leave the kiln through opening 5. The slag 7 produced will form a layer inside the iron bath 8 and will not come into contact with the wall 9 lined with ceramic material. The formation of fumes which is usually very annoying when refining with pure oxygen, is easily mastered, as the oxygen, according to this invention, can be brought into contact with the bath surface much more uniformly than with methods in use up till now, for instance, as illustrated by introducing it through a pipe to the center of the vessel. As the kiln is charged, the thickness of the layer of material 7, 8 is increased, and molten material leaves the kiln through the tapping hole 10. In comparison with the quantity of iron charged in the kiln, the surface of the bath is very large, which makes it possible to carry out the refining very rapidly. On account of its higher specific weight, the low carbon steel, produced during the process will form a layer close to the wall, whereas the pig iron, which should be exposed to the oxygen, gathers inside the steel layer. This type of kiln enables continuous operation, having as result that the kiln itself need not be large, as the iron can pass through it relatively quickly.

Besides for steelmaking, the kiln can be used for pig iron production, in which case it is charged with concentrates or fine-crushed ore and coke or coal breeze, and oxygen is introduced as described above in the center of the kiln. The carbon added is dissolved in the pig iron, and the reduction of the ore takes place in the pig iron melt with the carbon dissolved in the pig iron. The heat required is created by combustion with pure oxygen of the carbon monoxide formed during the reduction and of the extra amount of coke that might be necessary. The pig iron produced is tapped through the central hole in the bottom.

If two fluid phases 14 and 15 having different specific weights are present in the reaction vessel, it is possible, by variation of the speed of rotation, to tap out one or the other phase just as desired. When the inside diameter of the lighter phase 15 coincides with the diameter of the bottom hole 10 as illustrated in Fig. 2, a small decrease in the speed of rotation will cause this phase to run out through the hole. On the other hand it is possible to make the heavy phase 14 spread out over the whole bottom under the lighter one 15 by lowering the speed of rotation, and it is then possible to tap out only the heavier liquid, as is shown in Fig. 3. By adjusting the speed of rotation properly, it is possible to control every tapping from the vessel, and in that way to determine the time of treatment in same as desired.

The invention is particularly valuable when treating a liquid that can attack the wall of the vessel, as when treating corrosive liquids. It is then possible to add another, non-corrosive heavier liquid closest to the wall. In metallurgical metal-slag-reactions it is possible to make the metal place itself between the ceramic wall of the crucible and the slag, whereby attacks of the slag on the material in the crucible are avoided. It is advisable to construct the vessel in such a manner that the whole wall is outside the paraboloid surface of the non-corrosive liquid, and it is in many cases advisable to give the wall a form, which closely follows that of the paraboloid used, as the layer of liquid then can be made of uniform thickness.

The fact that the liquid or the liquids and, as a consequence, also the gases in the vessel are centrifuged makes it possible to separate the different phases of liquids sharply from each other, and to clean the gases from suspended particles.

This invention is especially useful for continuous operation, where the material to be treated is charged from above and is then moving downwards spirally, till the moment it can be discharged through the bottom hole.

What we claim is:

1. A method or refining molten iron which comprises supplying iron material and slag forming material to an annular body thereof in a vessel which is rotating on a vertical axis, said vessel having a charging opening at its upper end and a tapping hole at its lower end, and withdrawing refined iron and slag from said body through said tapping hole at a rate such as to maintain said body, and refining said iron material by continuously introducing oxygen into the space surrounded by said annular body.

2. A method as defined in claim 1 in which said iron material is molten pig iron and said refined iron is molten steel.

3. Method as defined in claim 1 in which said iron material is pulverulent iron oxide, pulverulent carbonaceous material is introduced together with said iron material and said refined iron is pig iron.

4. Method as defined in claim 1 in which slag and refined iron are withdrawn separately through said tapping hole.

5. Method as defined in claim 1 in which slag and refined iron are withdrawn simultaneously and continuously through said tapping hole.

References Cited in the file of this patent

UNITED STATES PATENTS

| | | |
|---|---|---|
| 1,332,585 | White | Mar. 2, 1920 |
| 1,484,465 | Billings | Feb. 19, 1924 |
| 2,151,360 | Tafel | Mar. 21, 1939 |
| 2,230,514 | Pemetzrieder | Feb. 4, 1941 |
| 2,546,937 | Wyandt et al. | Mar. 27, 1951 |
| 2,611,693 | Geyer | Sept. 23, 1952 |
| 2,741,554 | Rinesch | Apr. 10, 1956 |

FOREIGN PATENTS

| | | |
|---|---|---|
| 628,210 | Germany | Mar. 7, 1933 |